(12) United States Patent
Park et al.

(10) Patent No.: US 9,560,171 B2
(45) Date of Patent: Jan. 31, 2017

(54) METHOD AND APPARATUS FOR TRANSMITTING A MULTIMEDIA DATA PACKET

(75) Inventors: Kyung-Mo Park, Seoul (KR); Sung-Oh Hwang, Yongin-si (KR); Jae-Yeon Song, Seoul (KR); Doug Young Suh, Seongnam-si (KR); Yong Hun Lee, Suwon-si (KR)

(73) Assignees: Samsung Electronics Co., Ltd., Suwon-si (KR); UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 66 days.

(21) Appl. No.: 13/980,520

(22) PCT Filed: Jan. 19, 2012

(86) PCT No.: PCT/KR2012/000503
§ 371 (c)(1),
(2), (4) Date: Jul. 18, 2013

(87) PCT Pub. No.: WO2012/099421
PCT Pub. Date: Jul. 26, 2012

(65) Prior Publication Data
US 2013/0301656 A1 Nov. 14, 2013

(30) Foreign Application Priority Data
Jan. 19, 2011 (KR) .................. 10-2011-0005606

(51) Int. Cl.
*H04J 3/24* (2006.01)
*H04L 29/06* (2006.01)
(Continued)

(52) U.S. Cl.
CPC ............... *H04L 69/16* (2013.01); *H04L 65/80* (2013.01); *H04L 69/03* (2013.01); *H04L 69/30* (2013.01);
(Continued)

(58) Field of Classification Search
CPC .......... H04L 69/16; H04L 65/80; H04L 69/03; H04L 69/30; H04N 21/2381; H04N 21/6437
See application file for complete search history.

(56) References Cited

U.S. PATENT DOCUMENTS 7,383,320 B1 * 6/2008 Silberstein et al. .......... 709/219
7,990,971 B2 * 8/2011 Ra et al. ...................... 370/392
(Continued)

FOREIGN PATENT DOCUMENTS

| CN | 1720705 A | 1/2006 |
|---|---|---|
| CN | 101543018 A | 9/2009 |

(Continued)

OTHER PUBLICATIONS

Conta et al., A proposal for the IPv6 Flow Label Specification; draft-conta-ipv6-flow-label-02.txt, Jul. 1, 2001, pp. 1-28, No. 2.
(Continued)

*Primary Examiner* — Robert Wilson
(74) *Attorney, Agent, or Firm* — Jefferson IP Law, LLP

(57) ABSTRACT

A method and an apparatus for transmitting a multimedia data packet are provided. The method includes generating Media Abstraction Layer (MAL) information for abstracting information on the multimedia data to be transmitted, generating a multimedia data packet including said MAL information, and transmitting the generated multimedia data packet to a network entity.

5 Claims, 6 Drawing Sheets

(51) Int. Cl.
*H04N 21/2381* (2011.01)
*H04L 29/08* (2006.01)
*H04N 21/6437* (2011.01)

(52) U.S. Cl.
CPC ...... *H04N 21/2381* (2013.01); *H04N 21/6437* (2013.01)

(56) References Cited

U.S. PATENT DOCUMENTS

| | | | |
|---|---|---|---|
| 2003/0035397 A1* | 2/2003 | Haller ................ | G06F 9/44526 370/338 |
| 2006/0056455 A1* | 3/2006 | Ruiz Floriach et al. ..... | 370/469 |
| 2008/0253671 A1* | 10/2008 | Choi et al. ................ | 382/238 |
| 2009/0080452 A1 | 3/2009 | Ra et al. | |
| 2009/0175353 A1 | 7/2009 | Suh et al. | |
| 2011/0055550 A1* | 3/2011 | Jung et al. ................ | 713/151 |
| 2012/0066596 A1* | 3/2012 | Feng et al. ................ | 715/719 |
| 2012/0250690 A1 | 10/2012 | Suh et al. | |
| 2013/0286885 A1* | 10/2013 | Hwang et al. ................ | 370/252 |
| 2013/0301656 A1* | 11/2013 | Park et al. ................ | 370/474 |
| 2015/0043591 A1 | 2/2015 | Suh et al. | |

FOREIGN PATENT DOCUMENTS

| | | |
|---|---|---|
| KR | 10-2008-0066624 A | 7/2008 |
| KR | 10-2009-0031059 A | 3/2009 |
| KR | 10-2009-0079224 A | 7/2009 |
| WO | 2008/041085 A2 | 4/2008 |
| WO | 2009/154656 A1 | 12/2009 |
| WO | 2009/154657 A1 | 12/2009 |
| WO | 2011/068355 A2 | 6/2011 |

OTHER PUBLICATIONS

Schmid et al., RSVP Extension for IPv6 Flow Label Support; draft-schmid-rsvp-fl-01.txt, Aug. 1, 1998, pp. 1-22, No. 1.
Nichols et al., Definition of the Differentiated Services Field (DS Field) in the IPv4 and IPv6 Headers, Dec. 1, 1998, pp. 1-21.

* cited by examiner

METHOD AND APPARATUS FOR TRANSMITTING A MULTIMEDIA DATA PACKET

CROSS-REFERENCE TO RELATED APPLICATION(S)

This application is a National Stage application under 35 U.S.C. §371 of an International application filed on Jan. 19, 2012 and assigned application No. PCT/KR2012/000503, and claims the benefit under 35 U.S.C. §365(b) of a Korean patent application filed on Jan. 19, 2011 in the Korean Intellectual Property Office and assigned Serial No. 10-2011-0005606, the entire disclosure of which is hereby incorporated by reference.

TECHNICAL FIELD

The present disclosure relates to a method and an apparatus for transmitting a multimedia data packet. More particularly, the present disclosure relates to a method and an apparatus for transmitting a multimedia data packet adaptively according to a Quality of Service (QoS) scheme.

BACKGROUND

A multimedia service refers to, for example, a conversational service, such as a video phone, a streaming service, such as a Video On Demand (VOD) service, a multicast or broadcast service, or the like. A real time multimedia service can be divided into a conversational service, an interactive service, a streaming service, and the like. Further, the real time multimedia service can be divided into a unicast service, a multicast service, and a broadcast service, according to the number of users who participates in the service.

In order to provide a multimedia service, a scheme for providing a QoS in a network may be divided into a Best Effort (BE) scheme, a per-class QoS scheme, and a per-flow QoS scheme.

First, in the BE scheme, no support is provided for QoS. The per-class QoS scheme is a scheme in which packets have different degrees of importance and the packets are processed according to the degrees of the importance in the middle of the network. For example, in the per-class QoS scheme, a QoS control is performed according to a degree of importance, that is, according to a priority, of a corresponding packet, regardless of a flow to which the corresponding packet belongs. In order to support the per-class QoS scheme, a resource reservation between a transmission side and a reception side is not required. For example, the priority may be a loss priority, a delay priority, or the like.

The per-flow QoS scheme may be a scheme for reserving a resource per stream. For example, a resource (for example, a bit rate, or a buffer status) or QoS (i.e., a delay, a loss rate, or the like) is reserved per flow. Here, the flow refers to a stream used for a service. For example, a video stream, an audio stream, and a text stream which are used for providing a VOD service become separate flows, respectively.

In a Universal Mobile Telecommunications System (UMTS) $3^{rd}$ Generation (3G) of the 3G Partnership Project (3GPP) as well as the Institute of Electrical and Electronics Engineers (IEEE) 802.16 (Wireless Broadband (WiBRO), Worldwide Interoperability for Microwave Access (WI-MAX)), and Long Term Evolution (LTE) systems, a standard is established to support a per-class QoS scheme and a per-flow QoS scheme. However, in order to use the QoS scheme, an interface between a media layer of a higher layer and a network layer of a lower layer is needed.

Degrees of importance of video packets are different from packet to packet when using Moving Picture Experts Group-2 (MPEG-2) and H.264, or especially using Scalable Video Coding (SVC). In order to effectively control a QoS of a video service, the difference of the degrees of importance from packet to packet should be recognized. In an IPv6, in order to identify the importance by packet, after 5 tuples including a recipient's address, a sender's address, a port number of a corresponding service in the recipient's apparatus, a port number of a corresponding service in the sender's apparatus, and a protocol to be used are read, header data for identifying degrees of importance of packets should be read. This method needs time for processing each packet, and the independence of the protocol layer is violated. For example, packets should have been processed in a router with IP headers of packets, but it is not possible according to this method.

If degrees of importance by packet can be identified easily, a QoS control in a router may be performed smoothly. For example, if the network status is not good, packets can be removed from a less important packet according to importance of the packets.

Meanwhile, an SVC technique and a Multi-view Video Coding (MVC) technique which are in the process of standardization are based on the H.264/Advanced Video Coding (AVC) standard. Further, a Network Abstraction Layer Unit (NALU) format is also used in the configuration of bit strings of coded data.

FIG. 1 is a diagram illustrating a Video Coding Layer (VCL) and a Network Abstraction Layer (NAL) in H.264/AVC according to the related art.

Referring to FIG. 1, in H.264/AVC, a NAL 120 is defined between a VCL 110 that performs a video encoding process itself and a subsystem 130 that transmits and stores the coded information. Therefore, the VCL and the NAL are separated.

In order to map coded data 111 generated in the VCL, into bit strings for a subsystem, such as an H.264/AVC file format 131, a Real-time Transport Protocol (RTP) 133, or an MPEG-2 system 135, the NAL 120 processes the coded data 111 generated in the VCL, a parameter set, or information, such as Supplemental Enhancement Information (SEI) 113 in a NALU.

The NAL unit is divided into a VCL NAL unit 123 and a non-VCL NAL unit 125. The VCL NAL unit 123 is a NAL unit that corresponds to the coded data 111 generated in the VCL, while the non-VCL NAL unit 125 is a NAL unit that corresponds to a parameter set and information, such as a SEI 113.

The NAL unit basically includes a NAL header and Raw Byte Sequence Payload (RBSP) which is a data part generated as a result of a video compression in a VCL.

FIG. 2 is a diagram illustrating a format of a NAL unit according to the related art.

Referring to FIG. 2, a NAL unit 200 includes a NAL header 210 and a NAL payload 240.

The NAL header 210 generally has a size of 1 to 5 bytes. The NAL header 210 includes NALU type information 220 for indicating a kind of the NAL unit, and Layer Identification Information 230 for identifying a compressed layer of an original data included in the NAL payload.

The NALU type information 220 includes one bit of a fixed bit (F) field 221, two bits of a nal_ref_idc (NRI) field 222 for indicating whether the video is a reference picture or not, and five bits of a NALU type field 223 which is an identifier for indicating a kind of the NAL unit.

The layer identification information 230 may include a combination of a priority, a spatial hierarchy level, a temporal hierarchy level, and/or a quality hierarchy level. For example, the layer identification information 230 may include 8 bits of a priority field (hereinafter referred to as "P") 231 for indicating priority so that the compressed layer of the original data can be identified, 3 to 8 bits of a Dependency_id field (hereinafter referred to as "D") 232 for indicating a spatial hierarchy level, 3 to 8 bits of a Temporal_level field (hereinafter referred to as "T") 233 for indicating a temporal hierarchy level, and 2 to 8 bits of a Quality_level field (hereinafter referred to as "Q") 234 for indicating a quality hierarchy level.

For reference, the format of the NALU is used in Multiview Video Coding (MVC). Besides, in MVC, together with the NALU type information 220, instead of the layer identification information 230, view identification information for identifying a view can be included.

According to the format of the NAL unit according to the SVC or MVC of the related art, in order to identify the layer or the view of NAL unit, the layer identification information 230 or the view identification information of the NAL header needs to be parsed. Especially, the layer identification information 230 has a size of 4 bytes or less, and the layer to which the corresponding NAL unit belongs can be determined when values of the P 231, the D 232, the T 233, and the Q 234 are known by parsing the NAL header 210. However, parsing the entire NAL header 210 in order to find out the values of the P 231, the D 232, the T 233, and the Q 234 becomes a burden to a processor, and may be a cause of increasing the cost of a system.

Further, the NAL header 210 includes various kinds of information for identifying importance of packets like the layer identification information 230, such as the D 232, the T 233, and the Q 234 in addition to the NRI field 222 and the Priority field (P) 231. It is difficult to use the information since the relations among the kinds of information are not defined. For example, relating to the D 232, the T 233, and the Q 234 of the layer identification information, when a packet having "1" as a value of the D 232 and a packet having "1" as a value of the T 233 exist, if a relation for expecting a coding process is not understood, hierarchy on the priorities of the two packets may not be identified. Further, a NAL layer in a network of the related art is designed for a video service.

Therefore, for a future media service in which various media components, such as audios, videos, texts, and user interfaces are combined, a need exists for a multimedia abstraction layer which can be abstracted regardless of kinds of media components.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure provides a method and an apparatus for adaptively providing a multimedia service when providing a multimedia service.

Another aspect of the present disclosure is to provide a method and an apparatus for providing a multimedia service by a Media Abstraction Layer (MAL) that enables information in an application layer to be used in a lower network layer by abstracting various media elements.

Another aspect of the present disclosure is to provide a method and an apparatus for providing a multimedia service by a MAL that provides specific importance information for a lower layer based on the understanding in a Moving Picture Experts Group (MPEG) level.

Another aspect of the present disclosure is to provide a method and an apparatus for providing a multimedia service that enables easier access to information in a lower layer by inserting information generated by a MAL to an Internet Protocol (IP) header.

In accordance with an aspect of the present disclosure, a method of transmitting a multimedia data packet is provided. The method includes generating MAL information for abstracting information relating to multimedia data to be transmitted, generating a multimedia data packet including the MAL information, and transmitting the multimedia data packet to a network entity.

In accordance with another aspect of the present disclosure, a method for forwarding a multimedia data packet by an entity on a network is provided. The method includes receiving the multimedia data packet including MAL information for abstracting information relating to multimedia data information from a transmitter, and forwarding the multimedia data packet based on the received MAL information.

In accordance with another aspect of the present disclosure, an apparatus for transmitting a multimedia data packet is provided. The apparatus includes a MAL apparatus configured to generate MAL information for abstracting information relating to multimedia data to be transmitted, and a packet generating unit configured to generate a multimedia data packet including the MAL information and transmit the generated multimedia data packet to a network entity.

In accordance with another aspect of the present disclosure, a network entity apparatus for forwarding a multimedia data packet is provided. The network entity apparatus includes a forwarding policy determining unit configured to receive a multimedia data packet including MAL information for abstracting information relating to multimedia data from a transmitter, and forward the multimedia data packet based on the received MAL information.

In accordance with aspects of the present disclosure, a MAL that is applicable to all kinds of multimedia data is provided, so that a multimedia service can be provided by reflecting a priority, a resource reservation status, and a requirement of a user.

Further, in accordance with aspects of the present disclosure, a simplified configuration of a header is provided and an apparatus that receives an IP packet does not need to parse fields corresponding to a flow label every time so that a receiving apparatus can effectively utilize resources.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

An embodiment of the present disclosure improves a concept of a Network Abstraction Layer (NAL) used in standards for video data, such as Moving Picture Experts Group-4/Advanced Video Coding (MPEG-4/AVC), H.264, Scalable Video Coding (SVC), and Multi-view Video Coding (MVC) so that the improved concept can be applied to a video data service and data services for other media (for example, audio, graphics, or texts).

Figure 1:
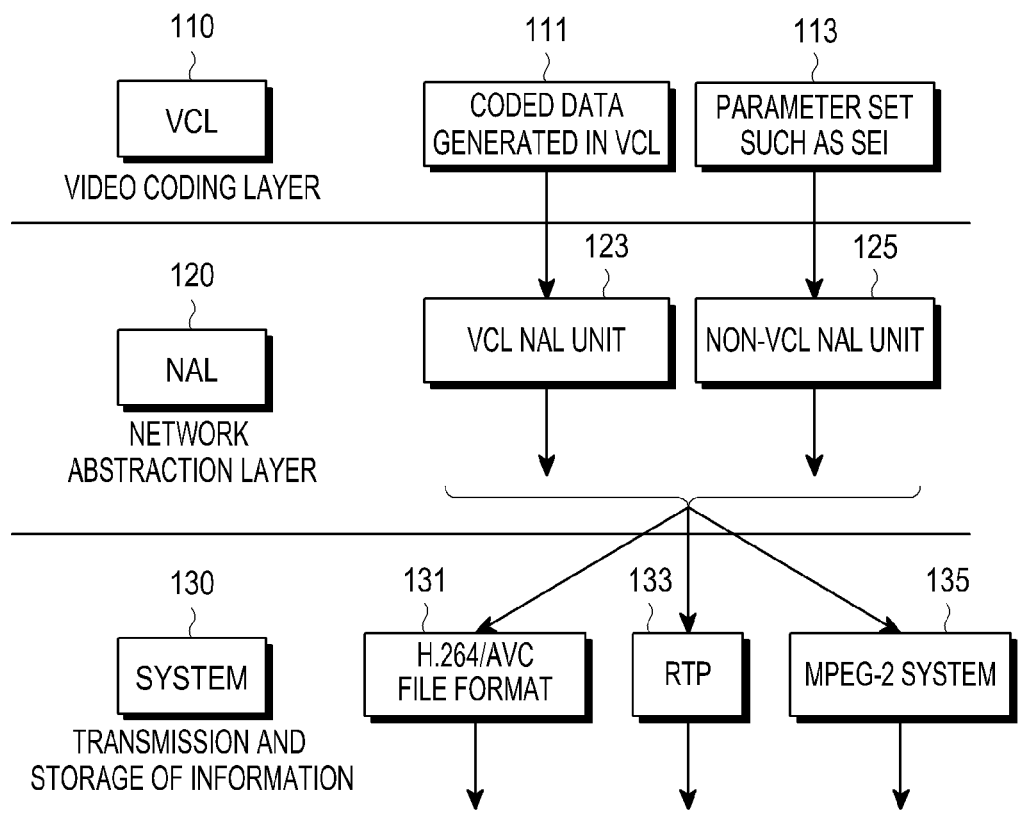
FIG. 1 is a diagram illustrating a Video Coding Layer (VCL) and a Network Abstraction Layer (NAL) in H.264/Advanced Video Coding (AVC) according to the related art.
Figure 2:
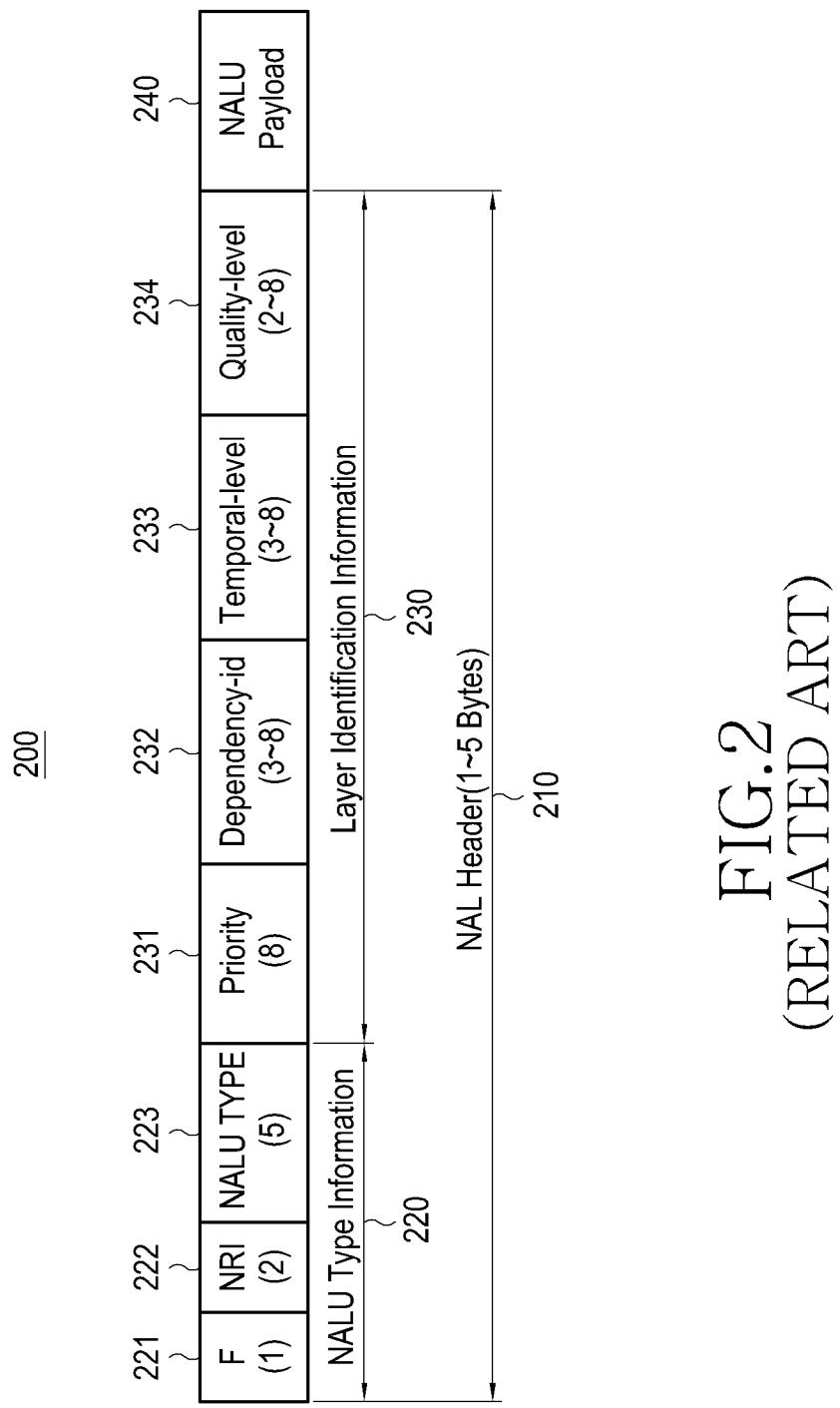
FIG. 2 is a diagram illustrating a format of a NAL unit according to the related art.

As illustrated in FIG. 2, the NAL header 210 of the related art includes various kinds of information for indicating a degree of importance of a video packet. Further, the NAL header used in SVC includes the layer identification information 230 for recognizing a temporal layer, a spatial layer, and a quality layer, and the NAL header used in MVC includes information for indicating view numbers.

The information included in the NAL header is abstracted and generated in a top-down interface transmitted from the higher protocol layer to the lower protocol layer. Since the information included in the NAL header can indicate the degree of the importance of the corresponding packet, a packet service can be adaptively provided according to the status of the network or the terminal depending on the information.

The present disclosure defines identifiers referred to as "media classifier" and "label" for expanding the concept of the NAL to all kinds of media. According to the present disclosure, the "media classifier" provides priority information which is abstracted so that priority information included in the media can be used by the lower protocol layer without concrete understanding on the media. The "label" is an identifier for differentiating each stream (for example, a video stream or an audio stream).

An aspect of the present disclosure suggests a Media Abstraction Layer (MAL) which is a top-down interface for abstracting information relating to media data to be transmitted. In the description below, the data related information which is abstracted in MAL may be called MAL information.

According to another aspect of the present disclosure, a transmitter (i.e., a server or a terminal) generates MAL information and transmits the MAL information included in a header of a packet. A network entity (i.e., a router, a base station, or the like) uses the MAL information to identify a degree of importance of the packet and resource reservation status, and transmits the packet accordingly.

Figure 3:
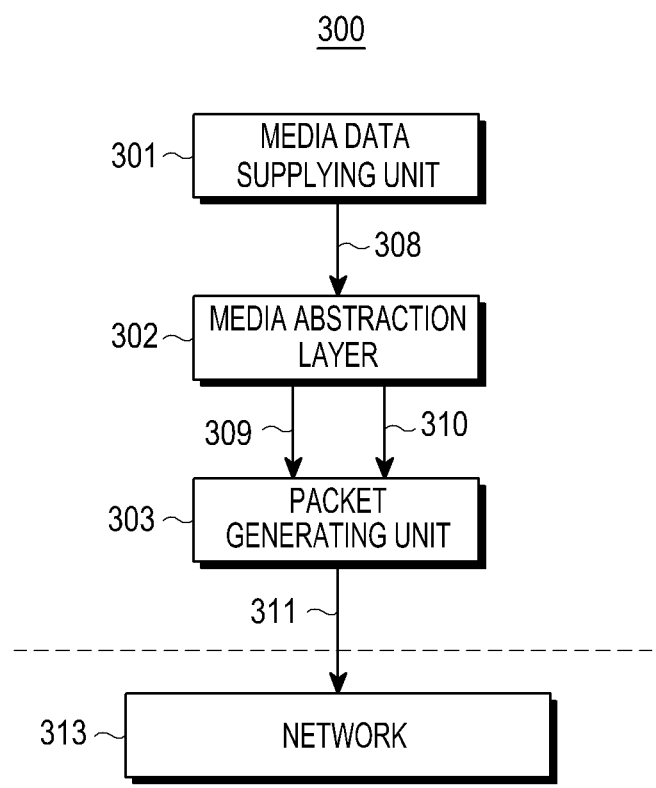
FIG. 3 is a diagram illustrating a configuration of a transmitter according to an embodiment of the present disclosure.

FIG. 3 is a diagram illustrating a configuration of a transmitter according to an embodiment of the present disclosure.

Referring to FIG. 3, a transmitter 300 includes a media data supplying unit 301, a media abstraction layer apparatus 302, and a packet generating unit 303. Here, the transmitter 300 may be, for example, a server for transmitting a multimedia service.

The media abstraction layer apparatus 302 receives 308 one Internet Protocol (IP) packet from the media data supplying unit 301, generates MAL information, and transmits 310 the MAL information to the packet generating unit 303. Further, the media abstraction layer apparatus 302 transmits 309 the IP packet received from the media data supplying unit 301 to the packet generating unit 303.

At this point, the MAL information relating to corresponding media data generated in the media abstraction layer apparatus 302 may include media classifier information and label information. As described above, the media classifier information may be used for recognizing abstracted information on a degree of importance of the media packet at a lower network, while the label information may be used for identifying the packet by a lower network.

The packet generating unit 303 generates a packet by using an IP packet 309 and the MAL information 310 received from the media abstraction layer apparatus 302, and transmits 311 the generated packet through a network 313.

The media classifier information and the label information included in the MAL information may be included in a header of the IP packet or a header of the packet of another lower protocol.

An example of transmitting a packet according to the configuration as illustrated in FIG. 3 is described as follows.

First, a per-class Quality of Service (QoS) scheme that uses a media classifier generated in MAL is described.

It is assumed that a media classifier of an audio data stream, a media classifier of a text data stream, and a media classifier of a video data stream are appointed (or set) to be 1, 2, and 3, respectively, between a server and a terminal. Further, it is assumed that priorities on the streams to which the media classifiers are set are appointed among a transmission side, a network entity, and a reception side.

At this point, if the transmission side desires to transmit a video data packet, a packet is generated and transmitted so that the media classifier information included in the corresponding packet is set to be 3. The network entity (for example, a router) may recognize a QoS class of the received packet by the media classifier information (for example, 3) included in the received packet. Thereafter, the network entity may determine whether to forward the packet in consideration of the network status and the forwarding policy of the QoS class.

Subsequently, a per-flow QoS scheme (for example, per-stream) that uses label information generated in the MAL is described.

It is assumed that a label of an audio data stream, a label of a text data stream, and a label of a video data stream are appointed (or set) to be 1, 2, and 3, respectively, between the server and the terminal.

At this point, if the transmission side desires to transmit a video data packet, a packet is generated and transmitted so that the label information included in the corresponding packet is set to be 3. Thereafter, a network entity (for example, a router) may recognize a degree of importance, a priority, or resource reservation information of the received packet by the label information (for example, 3) of the received packet. Thereafter, the network entity may transmit the packet in consideration of the network status and the degree of the importance, the priority, or the resource reservation information of the received packet.

The label by data stream and the degree of the importance, the priority, or the resource reservation information according to the label may be set in a process of a call setting among the transmission side, the reception side, and the network entity.

Hereinafter, the MAL information proposed in the present disclosure which is media abstraction layer information is described.

The MAL information included in a packet includes media classifier information for classifying an abstracted QoS class of a corresponding media by a network entity in a lower layer, and information for recognizing a degree of loss importance, a degree of delay importance, a priority, or resource reservation information of the data packet, in a form of a label (for example, a tag). Meanwhile, a format of the MAL information proposed by the present disclosure may be used together with other protocol standards of the related art, for example, an IP header, a Transmission Control Protocol (TCP) header, a User Datagram Protocol (UDP) header, and a Real-time Transport Protocol (RTP) header.

In order to provide a media service by using the MAL information, a call setting process between networks at transmission and reception sides is needed. For example, through the call configuration process, each of the network entities may appoint what the label values mean.

A table that lists values of what each of the label values means is called a Label Table (LT). If a call configuration process between networks at transmission and reception sides may be difficult like a broadcast network, a method for transmitting the LT at periodic time intervals may be used like Program Map Tables (PMT) of an MPEG-2 system.

Meanwhile, the MAL information may be classified into a media classifier format for the per-class QoS scheme and a label format for the per-stream QoS scheme.

The per-class QoS scheme abstracts a corresponding medium based on requirements for the loss rate and the transmission delay without a resource reservation process for service provision between the transmission side and the reception side, and includes the abstracted medium in a format of a classifier.

Figure 4:
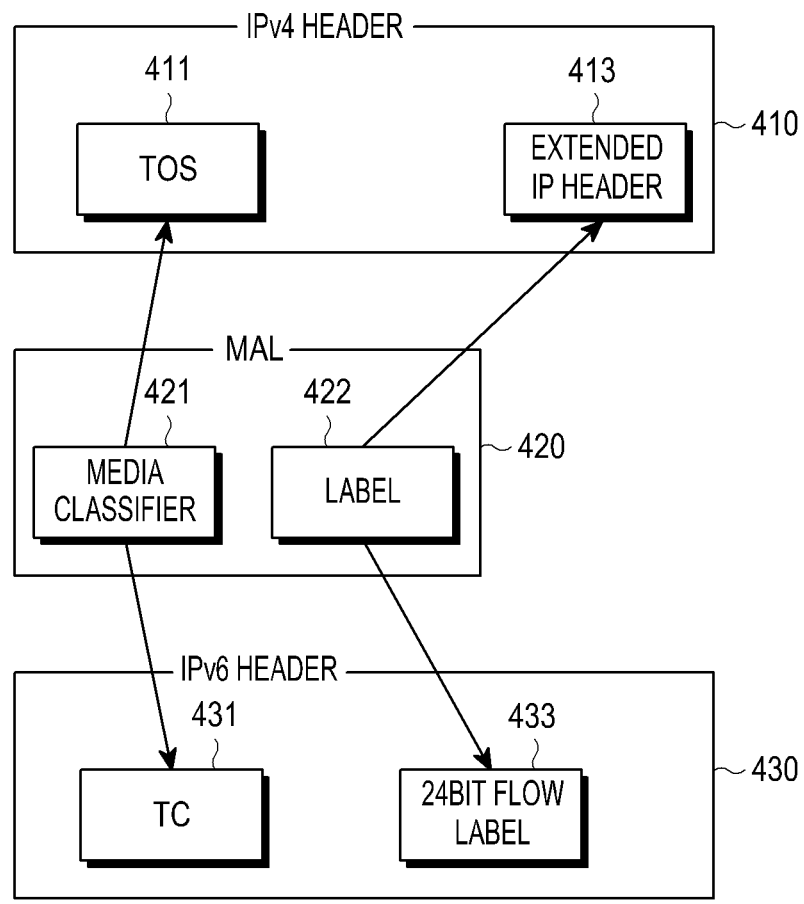
FIG. 4 is a diagram illustrating a method of inserting Media Abstraction Layer (MAL) information to an Internet Protocol (IP) packet according to an embodiment of the present disclosure.

For example, when one media service includes a video stream, an audio stream, and a text stream for supporting a subtitle, the MAL abstracts QoS classes according to transmission delay and loss requirements of the streams and determines the media classifier values to formats for classifying the abstracted classes. Selectively, the degree of the importance of the audio stream may be higher than the degree of the importance of the video stream. As illustrated in FIG. 4 described below, the value of the media classifier may be inserted to a Type Of Service (TOS) field of an Internet Protocol version 4 (IPv4) header or a Traffic Class (TC) field of an Internet Protocol version 6 (IPv6) header. For example, if the value of the media classifier is set to be 2 bits, degrees of the importance of the packets are differentiated into 11, 10, 01, and 00 in sequence, respectively. For example, 11, 10, and 01 may be inserted as values of the media classifiers to the audio packet, the text packet, and the video packet, respectively.

Subsequently, an example of applying different media classifiers for a plurality of sub streams that configures a single stream is described as follows.

If a video stream may be classified into three layers (i.e., a basic layer, an enhancement layer 1, and an enhancement layer 2) of different priorities like SVC, the basic layer has higher priority and the first arrival of the basic layer should be guaranteed. Thus, a QoS class with less transmission delay and packet loss is assigned to the basic layer. QoS classes with lower priorities are assigned to the first and second enhancement layers rather than the basic layer. If the size of the media classifier is set to be 2 bits like the example described above, the QoS classes for the basic layer, the enhancement layer 1, and the enhancement layer 2 may be differentiated to be 11, 10, and 01, respectively.

In the per-flow QoS scheme, resource reservation is performed stream by stream, and a corresponding flow has label information for the resource reservation. For example, if it is assumed that a resource of 300 kbps is reserved for a flow having a level value which is set to be 1, when a label value which is generated at the transmission side and included in the packet is 1 and the network entity identifies the label value included in the packet, the corresponding flow is to be transmitted by using a resource of 300 kbps corresponding to the label value of 1 based on the LT transmitted in the call setting process and the label value of the packet. Selectively, at this point, a currently available resource may be considered together.

Further, the resource reservation may be performed session by session. For example, according to whether a unit for the resource reservation for supporting label switching at the time of the call setting between the networks at transmission and reception sides is a stream unit or a session unit, the label information can be set by a stream unit or by a session unit.

Further, the resource reservation process and the label information setting may be appointed in the call setting process between the transmission and reception sides. At this point, when the network entity supports Multi Protocol Label Switching (MPLS), the format of the label may be configured to have compatibility with the format of the label supported by the MPLS. At this point, if the reception side can recognize the label that has the compatibility with the label of the MPLS scheme, the NAL header of the related art which is defined in an SVC may not be transmitted. Further, the information that does not change during one session among content of the RTP header and UDP header of the related art may be inserted to the label. The label switching is a technique in which the packet at the third layer is routed at the second layer. In the technique, a separate label is added instead of an IP address in the data packet, and switching is performed by using the added label, so that the high speed switching can be performed.

Subsequently, a method of transmitting the MAL information is described.

FIG. 4 is a diagram illustrating a method of inserting MAL information to an IP packet according to an embodiment of the present disclosure.

Referring to FIG. 4, a virtual header for a MAL packet is defined in a MAL information format. The content included in a virtual header is to be included in a packet header in a lower layer (for example, an IP packet header). A virtual header 420 is internally classified into a media classifier header 421 and a label header 422.

The media classifier header 421 may be applied when the lower layer uses the per-class QoS scheme, a length of the media classifier header 421 may be different according to the system setting. If the compatibility with the per-class QoS protocol of the lower layer is considered, the length is 3 to 6 bits. The media classifier header 421 may be inserted to a TOS field 411 of an IPv4 header 410 and a TC field 431 of an IPv6 header 430.

The label header 422 can be applied when the lower layer uses the per-flow QoS scheme. The label header 422 with the size of 8 bits includes 7 bits including a label number and 1 bit of an expansion flag bit for expansion, if needed. The label header 422 may be inserted to an extended IP header 413 of the IPv4 header 410 and to a flow label field 433 of the IPv6 header 430.

Figure 5:
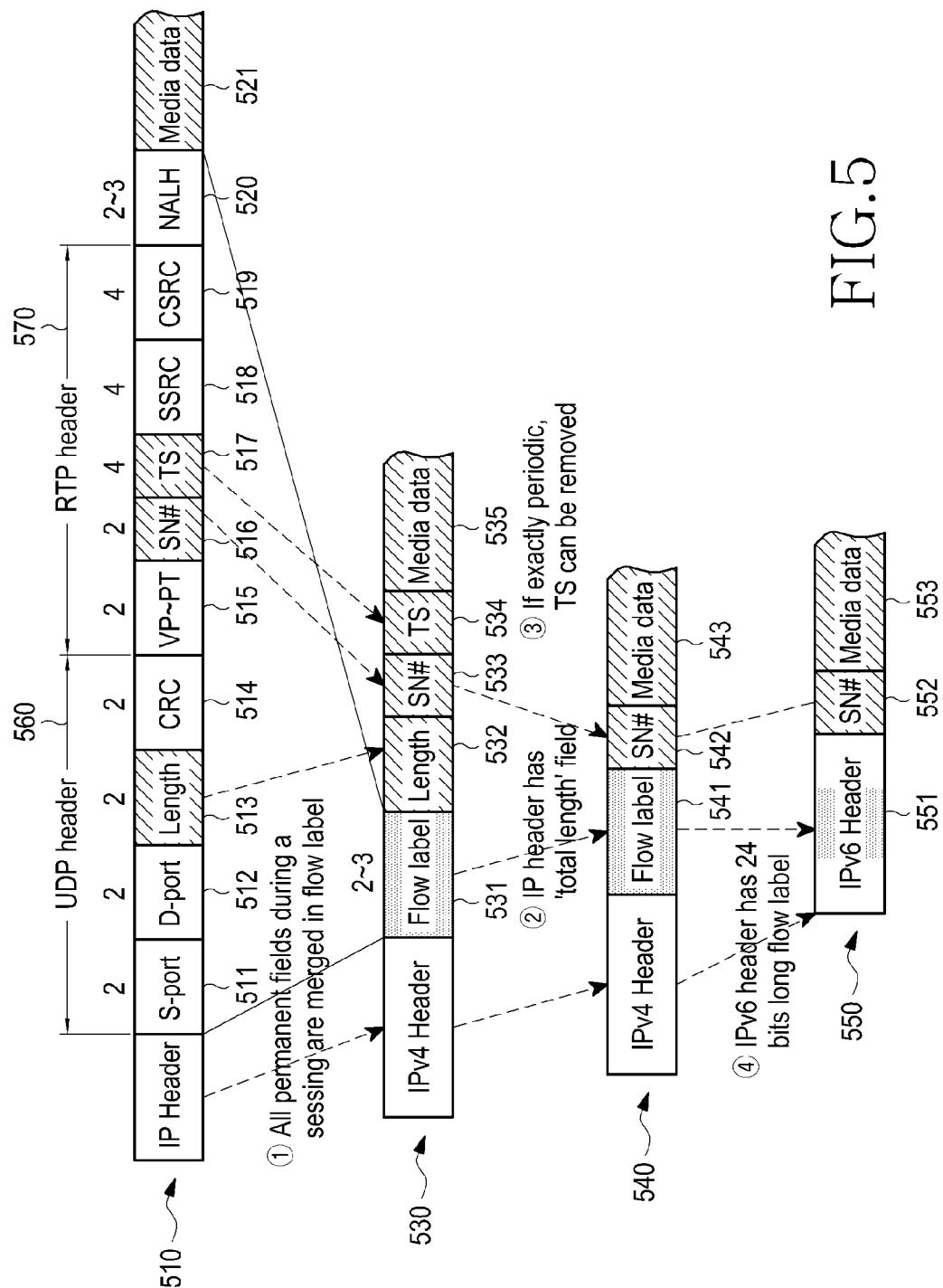
FIG. 5 is a diagram illustrating a configuration of an IP packet header including MAL information according to an embodiment of the present disclosure.

FIG. 5 is a diagram illustrating a configuration of an IP packet header including MAL information according to an embodiment of the present disclosure.

Referring to FIG. 5, it illustrates a method of simplifying a header by removing repeated parts in the UDP header and the RTP header among a plurality of packets and inserting such information to LT, in order to apply the simplified header to a real-time media stream. Reference numerals 510, 530, and 540 denote IPv4 packets, and reference numeral 550 denotes an IPv6 packet. FIG. 5 shows an example of generating label information by simplifying the UDP header and the RTP header in each packet.

Reference numeral 510 denotes a media packet for transmitting real time media data, such as an on-demand video service. Reference numeral 560 denotes a UDP header, and reference numeral 570 denotes an RTP header.

In a real time media service, tens or hundreds of packets per second are transmitted for one session in general. Due to the nature of the real time media stream, headers of transmitted media packets include fields that similarly repeat in each packet transmitted for one session. Reference numeral 511, 512, 514, 515, 518, 519, and 520 are fields that repeat for each packet, and reference numeral 513, 516 (or 533, 542, 552), and 517 are fields that differentiate by packet (of course, the fields may be the same or be overlapped with other fields), but the description of the fields will not be provided since it may make the subject matter of the present disclosure rather unclear.

One of the important fields is a Network Abstraction Layer Header (NALH) field of reference numeral 520. The field represents an NAL header and includes a degree of importance or priority of a packet as illustrated in FIG. 2.

In the packet denoted by reference numeral 530, the fields 511, 512, 514, 515, 518, 519, and 520 that repeat in the UDP header 560 and the RTP header 570 of the packet 520 are combined to be inserted into one item of label information (flow label field) 531, and the fields 513, 516, and 517 that may be different packet by packet will be arranged after the flow label field 531 (equivalent to flow label field 541).

In the packet denoted by reference numeral 530, a length field 532 overlaps a length field (not illustrated) included in the IP header. Therefore, the length field 532 may be omitted. Further, a TS field 534 is a time stamp wherein if the generation of the media data 535 (equivalent to media data 521, 535, 543, and 553) is periodic, information of the time stamp can be known according to the calculation at the reception side, and therefore the information can be omitted.

The packet denoted by reference numeral 540 indicates the length field 532 that overlaps in the packet denoted by reference numeral 530 and a packet in which the TS field 534 which can be calculated at the reception side is omitted.

The packet denoted by reference numeral 550 illustrates an IPv6 packet. An IPv6 header 551 has a 24-bit-long flow label field, and the MAL information can be inserted to the IPv6 header by using the field.

When using the unsimplified header of the related art, the reception side should parse all fields. However, if the header is simplified as illustrated in FIG. 5, the fields corresponding to the flow label may not be parsed every time.

The MAL information defined in the present disclosure has been described as above. The MAL information like this may provide a service that guarantees a per-class QoS scheme and a per-flow QoS scheme by using a degree of importance and a priority which are abstracted without understanding on a media stream.

Meanwhile, in an MPEG technique, a network entity that performs forwarding by understanding a degree of importance of media and priority information and using the same is referred to as a Media Aware Network Element (MANE). Referring to the operation of the MANE, for example, the network entity that forwards a received media packet like a router, a Media Access Control (MAC) of an Institute of Electrical and Electronics Engineers (IEEE) 802 series, or a Broadcast Multicast Service Center (BMSC) of a 3GPP series may operate as a MANE that can perform forwarding adaptively according to a degree of importance of a packet according to the media classifier information included in the MAL information. For example, in a router that uses a Differentiated Service (DiffServ) routing scheme, if data exceeds a buffer, packets are removed from a packet with a lower priority. For this, a value of a media classifier of the MAL information is determined.

In a per-class QoS scheme, the network entity adaptively processes packets using a degree of importance included in the IP header, that is, a value of a media classifier, regardless of the kind of the service to which the received packet belongs. For example, when it is received that a value of a media classifier of an audio packet is 11, a value of a media classifier of a video packet in a basic layer is 10, a value of a media classifier of a video packet in an enhancement layer 1 is 01, and a value of a media classifier of the video packet in an enhancement layer 2 is 00, if the network entity should remove one of the packets due to the network status or an excess of a router buffer, the network entity should remove a packet according to the media classifier value. For example, packets are removed in a sequence of the video packet in the enhancement layer 2, the video packet in the enhancement layer 1, the video packet in the basic layer, and the basic layer. For example, in the IEEE 802.11e standard, a packet is inserted to a queue determined according to information on the degree of the importance written on the IP header. Priorities are set in 4 levels, and the speed of a packet passing through the queue and a method of processing a packet loss may be different queue by queue.

In a per-flow QoS scheme, a level value which is a media identifier is determined and QoS (for example, a bit rate, a loss rate, or delay) is supported by using a resource determined according to the level value. The resource may be determined according to a resource corresponding to the label by searching the previously stored resource reservation table by stream. For example, if QoS on an audio stream is determined to be an Unsolicited Guaranteed Service (UGS) in IEEE 802.16, a QoS requirement determined accordingly is secured. Therefore, the resource reservation table is stored in the network entity until the corresponding service ends. For example, if a packet is received from a transmitting side, a label of the corresponding packet is identified so that the QoS requirement of the corresponding label stream is searched for in the resource reservation table and a service is provided according to the corresponding resource.

Figure 6:
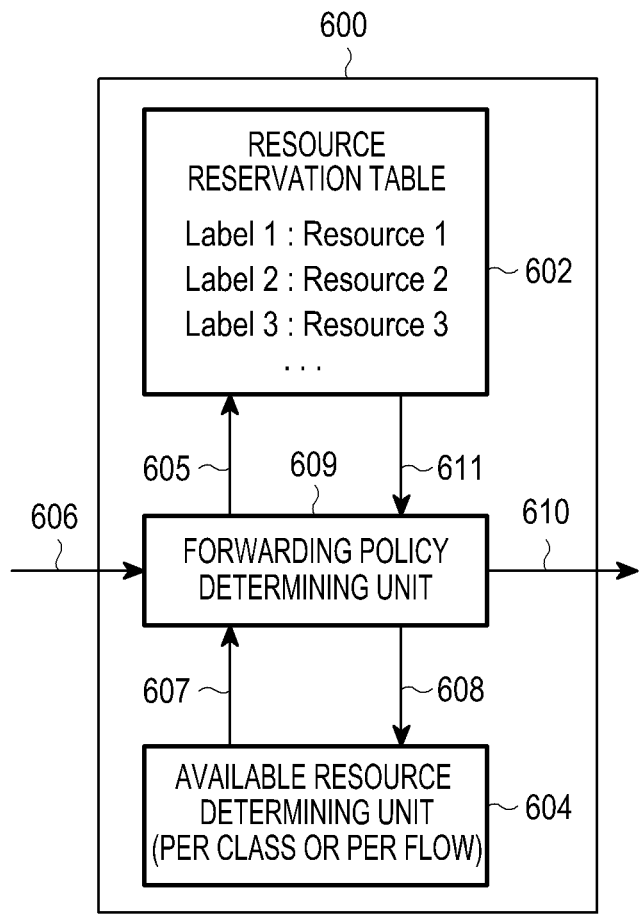
FIG. 6 is a diagram illustrating a configuration of a Media Aware Network Element (MANE) according to an embodiment of the present disclosure.

FIG. 6 is a diagram illustrating a configuration of a MANE according to an embodiment of the present disclosure.

Referring to FIG. 6, if a forwarding policy determining unit 609 of a MANE 600 receives a packet 606 from the transmission side, the packet is adaptively forwarded 610 according to a forwarding policy. The forwarding policy may differ according to values of the media classifier included in the MAL information of the received packet.

If the MANE 600 supports a QoS scheme by service class, the MANE 600 determines a class of the media classifier of the corresponding packet, and determines whether to forward the corresponding packet accordingly. Meanwhile, if the MANE 600 supports a per-flow QoS scheme (that is, per-stream), the MANE 600 determines the label value, determines a resource assigned to the corresponding label stored in a resource reservation table 602 (inquiry-605, inquiry result reception-611), determines the available resource information of an available resource determining unit 604 (inquiry-608, inquiry result reception-607), determines a forwarding policy within the available resource, and forwards 610 the packet.

Figure 7:
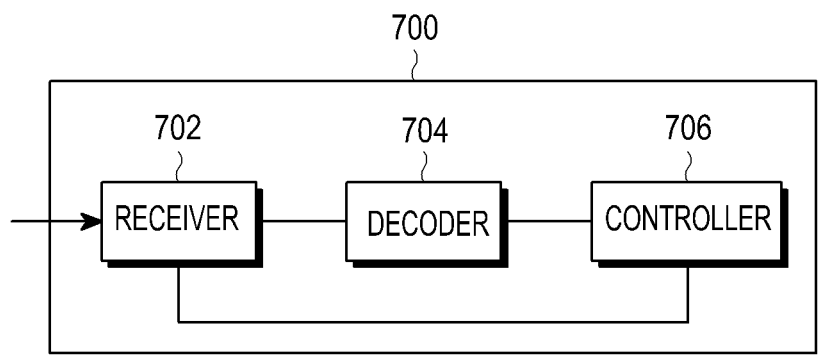
FIG. 7 is a diagram illustrating a configuration of a receiving apparatus according to an embodiment of the present disclosure.

FIG. 7 is a diagram illustrating a configuration of a receiving apparatus according to an embodiment of the present disclosure.

Referring to FIG. 7, a receiving apparatus 700 may be, for example, a user equipment and may include a decoder 704 for each stream, a receiver 702 that receives a signal, and a controller 706 that controls the decoder 704. The decoder 704 may include as many buffers (not illustrated) as needed.

If a packet received from the receiver 702 includes a label, the controller 706 determines the label, and checks the decoder 704 that corresponds to the packet. Further, if a packet received from the receiver 702 does not include a label, the controller 706 reads a TCP or UDP header, and checks the decoder 704 for decoding of a media packet.

It should be understood that the configurations, operations, or flows of signals illustrated in FIGS. 3 to 7 are not directed to limit the scope of the disclosure. For example, the configurations and operations illustrated in FIGS. 3 to 7 are described for illustrative purposes, and it does not mean that the present disclosure should include all the processes, or the processes should be performed separately.

The operations described above can be realized by including a memory apparatus that stores corresponding program codes in a certain component in the network entity apparatus, such as the transmitter 300, the receiving apparatus 700, or the MANE 600. For example, the component in the network entity apparatus, such as the transmitter 300, the receiving apparatus 700, or the MANE 600 may be realized by a processor or a Central Processing Unit (CPU) that reads and executes the program codes stored in the memory apparatus.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method of transmitting a multimedia data packet, the method comprising:
   identifying, by a processor of a transmitter, media abstraction layer (MAL) information relating to multimedia data to be transmitted;
   generating, by the processor, a multimedia data packet including the MAL information; and
   transmitting, by the processor, the multimedia data packet,
   wherein the MAL information comprises media classifier information indicating a priority for a transmission of the multimedia data packet, and
   wherein the MAL information is identified in an application layer.

2. The method of claim 1, wherein the media classifier information is included in any one of a type of service (TOS) field of an internet protocol version 4 (IPv4) packet header or a traffic class (TC) field of an internet protocol version 6 (IPv6) packet header.

3. The method of claim 1,
   wherein the MAL information comprises label information, and
   wherein the label information includes an identifier for differentiating a stream of the media data.

4. The method of claim 3, wherein the label information is included in any one of an extended field of an internet protocol version 4 (IPv4) packet header or an extended field of an internet protocol version 6 (IPv6) packet header.

5. The method of claim 3, wherein the label information is generated by substituting a part that repeats in a user datagram protocol (UDP) header and a real-time transport protocol (RTP) header of the multimedia data packet into a flow label.

* * * * *